US006895376B2

(12) United States Patent
Perronnin et al.

(10) Patent No.: US 6,895,376 B2
(45) Date of Patent: May 17, 2005

(54) EIGENVOICE RE-ESTIMATION TECHNIQUE OF ACOUSTIC MODELS FOR SPEECH RECOGNITION, SPEAKER IDENTIFICATION AND SPEAKER VERIFICATION

(75) Inventors: Florent Perronnin, Santa Barbara, CA (US); Roland Kuhn, Santa Barbara, CA (US); Patrick Nguyen, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 508 days.

(21) Appl. No.: 09/849,174

(22) Filed: May 4, 2001

(65) Prior Publication Data

US 2003/0046068 A1 Mar. 6, 2003

(51) Int. Cl.[7] ............................................. G10L 17/00
(52) U.S. Cl. ........................ 704/250; 704/255; 704/203
(58) Field of Search ................................ 704/250, 255, 704/203, 206, 222, 230, 231, 232, 233, 236, 240, 246, 238, 251, 270, 272, 273, 275

(56) References Cited

U.S. PATENT DOCUMENTS

| | | | |
|---|---|---|---|
| 5,046,099 A | | 9/1991 | Nishimura |
| 5,664,059 A | | 9/1997 | Zhao |
| 5,864,810 A | * | 1/1999 | Digalakis et al. ............ 704/255 |
| 6,073,096 A | * | 6/2000 | Gao et al. .................... 704/245 |
| 6,141,644 A | * | 10/2000 | Kuhn et al. .................. 704/273 |
| 6,327,565 B1 | * | 12/2001 | Kuhn et al. .................. 704/255 |
| 6,343,267 B1 | * | 1/2002 | Kuhn et al. .................. 704/222 |
| 6,571,208 B1 | * | 5/2003 | Kuhn et al. .................. 704/250 |

OTHER PUBLICATIONS

A. Acero et al., "Speaker and gender normalization for continous–density Hidden Markov Models," IEEE ICASSP '96, vol. 1, pp. 342–345, May 1996.*
R. Kuhn et al., "Eigenvoices for speaker adaptation," Int. Conf. Speech Language Processing '98, vol. 5, Nov. 30–Dec. 4, 1998, pp. 1771–1774.*
Kuhn et al., "Rapid speaker adaptation in eigenvoice space," IEEE Transactions on Speech and Audio Processing, vol. 8, No. 6, pp. 695–707, Nov. 2000.*
Padmanabhan et al., "Speaker clustering and transformations for speaker adaptation in speech recognition systems," IEEE Transactions on Speech and Audio Processing, vol. 6, No. 1, pp. 71–77, Jan. 1998.*
Hazen et al., "A Comparision of novel techniques for instantaneous speaker adaptation," Proc. of Eurospeech97, pp. 2047–2050.*

* cited by examiner

Primary Examiner—Susan McFadden
(74) Attorney, Agent, or Firm—Harness, Dickey & Pierce, PLC

(57) ABSTRACT

A reduced dimensionality eigenvoice analytical technique is used during training to develop context-dependent acoustic models for allophones. Re-estimation processes are performed to more strongly separate speaker-dependent and speaker-independent components of the speech model. The eigenvoice technique is also used during run time upon the speech of a new speaker. The technique removes individual speaker idiosyncrasies, to produce more universally applicable and robust allophone models. In one embodiment the eigenvoice technique is used to identify the centroid of each speaker, which may then be "subtracted out" of the recognition equation.

18 Claims, 8 Drawing Sheets

EIGENVOICE RE-ESTIMATION TECHNIQUE OF ACOUSTIC MODELS FOR SPEECH RECOGNITION, SPEAKER IDENTIFICATION AND SPEAKER VERIFICATION

BACKGROUND AND SUMMARY OF THE INVENTION

The present invention relates generally to automated speech recognition. More particularly, the invention relates to a re-estimation technique for acoustic models used in automated speech recognition systems.

Speech recognition systems that handle medium sized and large vocabularies usually take as their basic units phonemes or syllables, or phonemes sequences within a specified acoustic context. Such units are typically called context dependent acoustic models or allophones models. An allophone is a specialized version of phoneme defined by its context. For instance, all the instances of 'ae' pronounced before 't', as in "bat," "fat," etc. define an allophone of 'ae'.

For most languages, the acoustic realization of a phoneme depends very strongly on the preceding and following phonemes. For instance, an 'eh' preceded by a 'y' (as in "yes") is quite different from an 'eh' preceded by 's' (as in "set").

For a variety of reasons, it can be beneficial to separate or subdivide the acoustic models into separate speaker dependent and speaker independent parts. Doing so allows the recognition system to be quickly adapted to a new speaker by using the speaker dependent part of the acoustic model as a centroid to which transformations corresponding to the speaker independent part may be applied. In our copending application entitled "Context-Dependent Acoustic Models For Medium And Large Vocabulary Speech Recognition With Eigenvoice Training," Ser. No. 09/450,392 filed Nov. 29, 1999, we described a technique for developing context dependent models for automatic speech recognition in which an eigenspace is generated to represent a training speaker population and a set of acoustic parameters for at least one training speaker is then represented in that eigenspace. The representation in eigenspace comprises a centroid associated with the speaker dependent components of the speech model and transformations, associated with the speaker independent components of the model. When adapting the speech model to a new speaker, the new speaker's centroid within the eigenspace is determined and the transformations associated with that new centroid may then be applied to generate the adapted model.

The technique of separating the variability into speaker dependent and speaker independent parts enables rapid adaptation because typically the speaker dependent centroid contains fewer parameters and is thus quickly relocated in the eigenspace without extensive computation. The speaker independent transformations typically contain far more parameters (corresponding to the numerous different allophone contexts). Because these speaker independent transformations may be readily applied once the new centroid is located, very little computational effort is expended.

While the forgoing technique of separating speaker variability into constituent speaker dependent and speaker independent parts shows much promise, we have more recently discovered a re-estimation technique that greatly improves performance of the aforesaid method. According to the present invention a set of maximum likelihood re-estimation formulas may be applied: (a) to the eigenspace, (b) to the centroid vector for each training speaker and (c) to the speaker-independent part of the speech model. The re-estimation procedure can be applied once or iteratively.

The result is a speech recognition model (employing the eigenspace, centroid and transformation components) that is well tuned to separate the speaker dependent and speaker independent parts. As will be more fully described below, each re-estimation formula augments the others: one formula provides feedback to the next. Also, as more fully explained below, the re-estimation technique may be used at adaptation time to estimate the location of a new speaker, regardless of what technique is used in constructing the original eigenspace at training time.

Let $MU(S,P)$ be the portion of the eigencentroid for speaker S that pertains to phoneme P. To get a particular context-dependent variant of the model for P—that is, an allophone model for P in the phonetic context C—apply a linear transformation $T(P,C)$ to $MU(P,C)$. This allophone model can be expressed as:

$$M(S,C,P) = T(P,C) * MU(S,P).$$

In our currently preferred embodiment, T is the simple linear transformation given by a translation vector $\delta$. Thus, in this embodiment:

$$M(S,C,P) = MU(S,P) + E(P,C).$$

For instance, allophone 1 of $MU(S,P)$ might be given by $MU(S,P)+E_1$, allophone 2 might be given by $MU(S,P)+E_2$ and so on.

For a more complete understanding of the invention, its objects and advantages, refer to the following specification and to the accompanying drawings.

DESCRIPTION OF THE PREFERRED EMBODIMENTS

Figure 1:
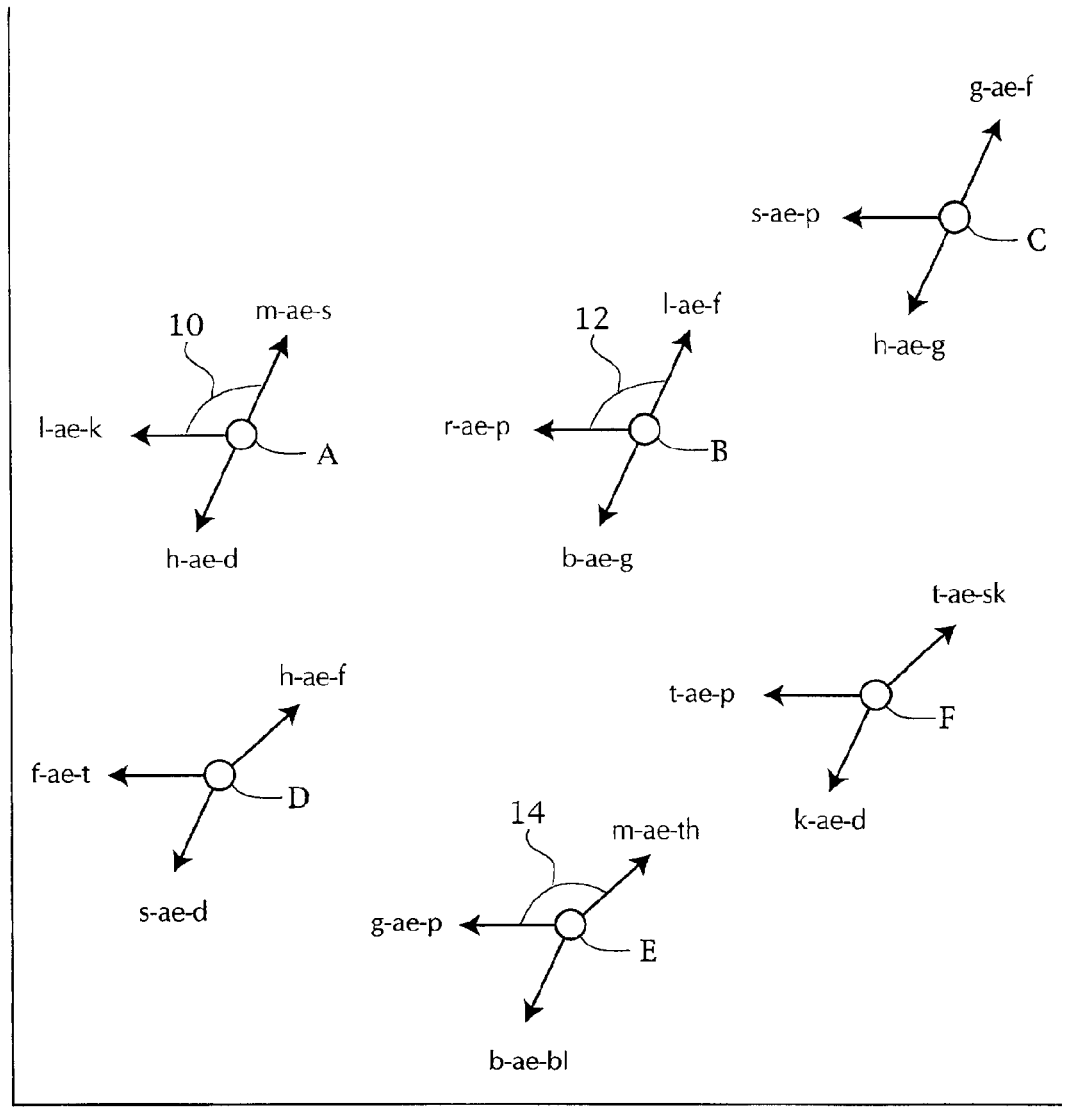
FIG. 1 is a diagrammatic illustration of speaker space useful in understanding how the centroids of a speaker population and the associated allophone vectors differ from speaker to speaker.

In our copending application entitled, Context-Dependent Acoustic Models for Medium and Large Vocabulary Speech Recognition with Eigenvoice Training, filed Nov. 29, 1999, Ser. No. 09/450,392, we describe several techniques which capitalize on the ability to separate variability between speaker-dependent and speaker-independent parts of a speech model. Several embodiments are described, showing how the techniques may be applied to various speech recognition problems.

The re-estimation technique of the present invention offers significant improvement to the Eigenvoice techniques described in our earlier copending application. The re-estimation techniques of the invention provide a greatly improved method for training Eigenvoice models for speech recognition. As will be more fully described below, the re-estimation technique involves a maximum-likelihood re-estimation of the eigenspace, and of the centroid and transformation components of the speech model defined within the eigenspace. Some of the re-estimation formulas used to develop the improved models according to the re-estimation technique may also be separately used to improve how adaptation to an individual speaker is performed during use.

An Exemplary Speech Recognition System Employing Eigenvoice Speech Models

To better understand the re-estimation techniques of the invention, an understanding of the eigenvoice speech model will be helpful. Therefore, before giving a detailed explanation of the re-estimation techniques, a description of an exemplary recognition system employing an eigenvoice speech model will next be provided below. The example embodiment is optimized for applications where each training speaker has supplied a moderate amount of training data: for example, on the order of twenty to thirty minutes of training data per speaker. It will be understood that the invention may be applied to other applications and to other models where the amount of training data per speaker may be different.

With twenty to thirty minutes of training data per speaker it is expected that there will be enough acoustic speech examples to construct reasonably good context independent, speaker dependent models for each speaker. If desired, speaker adaptation techniques can be used to generate sufficient data for training the context independent models. Although it is not necessary to have a full set of examples of all allophones for each speaker, the data should reflect the most important allophones for each phoneme somewhere in the data (i.e., the allophones have been pronounced a number of times by at least a small number of speakers).

The recognition system of this embodiment employs decision trees for identifying the appropriate model for each allophone, based on the context of that allophone (based on its neighboring phonemes, for example). However, unlike conventional decision tree-based modeling systems, this embodiment uses speaker-adjusted training data in the construction of the decision trees. The speaker adjusting process, in effect, removes the particular idiosyncrasies of each training speaker's speech so that better allophone models can be generated. Then, when the recognition system is used, a similar adjustment is made to the speech of the new speaker, whereby the speaker-adjusted allophone models may be accessed to perform high quality, context dependent recognition.

An important component of the recognition system of this embodiment is the Eigenvoice technique by which the training speaker's speech, and the new speaker's speech, may be rapidly analyzed to extract individual speaker idiosyncrasies. The Eigenvoice technique, discussed more fully below, defines a reduced dimensionality Eigenspace that collectively represents the training speaker population. When the new speaker speaks during recognition, his or her speech is rapidly placed or projected into the Eigenspace to very quickly determine how that speaker's speech "centroid" falls in speaker space relative to the training speakers.

As will be fully explained, the new speaker's centroid (and also each training speaker's centroid) is defined by how, on average, each speaker utters the phonemes of the system. For convenience, one can think of the centroid vector as consisting of the concatenated Gaussian mean vectors for each state of each phoneme HMM in a context independent model for a given speaker. However, the concept of "centroid" is scalable and it depends on how much data is available per training speaker. For instance, if there is enough training data to train a somewhat richer speaker dependent model for each speaker (such as a diphone model), then the centroid for each training speaker could be the concatenated Gaussian means from this speaker dependent diphone model. Of course, other models such as triphone models and the like, may also be implemented.

FIG. 1 illustrates the concept of the centroids by showing diagrammatically how six different training speakers A–F may pronounce phoneme 'ae' in different contexts. FIG. 1 illustrates a speaker space that is diagrammatically shown for convenience as a two-dimensional space in which each speaker's centroid lies in the two-dimensional space at the center of the allophone vectors collected for that speaker. Thus, in FIG. 1, the centroid of speaker A lies at the origin of the respective allophone vectors derived as speaker A uttered the following words: "mass", "lack", and "had". Thus the centroid for speaker A contains information that in rough terms represents the "average" phoneme 'ae' for that speaker.

By comparison, the centroid of speaker B lies to the right of speaker A in speaker space. Speaker B's centroid has been generated by the following utterances: "laugh", "rap," and "bag". As illustrated, the other speakers C–F lie in other regions within the speaker space. Note that each speaker has a set of allophones that are represented as vectors emanating from the centroid (three allophone vectors are illustrated in FIG. 1). As illustrated, these vectors define angular relationships that are often roughly comparable between different speakers. Compare angle 10 of speaker A with angle 12 of speaker B. However, because the centroids of the respective speakers do not lie coincident with one another, the resulting allophones of speakers A and B are not the same. The present invention is designed to handle this problem by removing the speaker-dependent idiosyncrasies characterized by different centroid locations.

While the angular relationships among allophone vectors are generally comparable among speakers, that is not to say that the vectors are identical. Indeed, vector lengths may vary from one speaker to another. Male speakers and female speakers would likely have different allophone vector lengths from one another. Moreover, there can be different angular relationships attributable to different speaker dialects. In this regard, compare angle 14 of speaker E with angle 10 of speaker A. This angular difference might reflect, for example, a situation where speaker A speaks a northern United States dialect whereas speaker E speaks a southern United States dialect.

These vector lengths and angular differences aside, the disparity in centroid locations represents a significant speaker-dependent artifact that conventional context dependent recognizers fail to address. As will be more fully explained below, the present invention provides a mechanism to readily compensate for the disparity in centroid locations and also to compensate for other vector length and angular differences.

Figure 2:
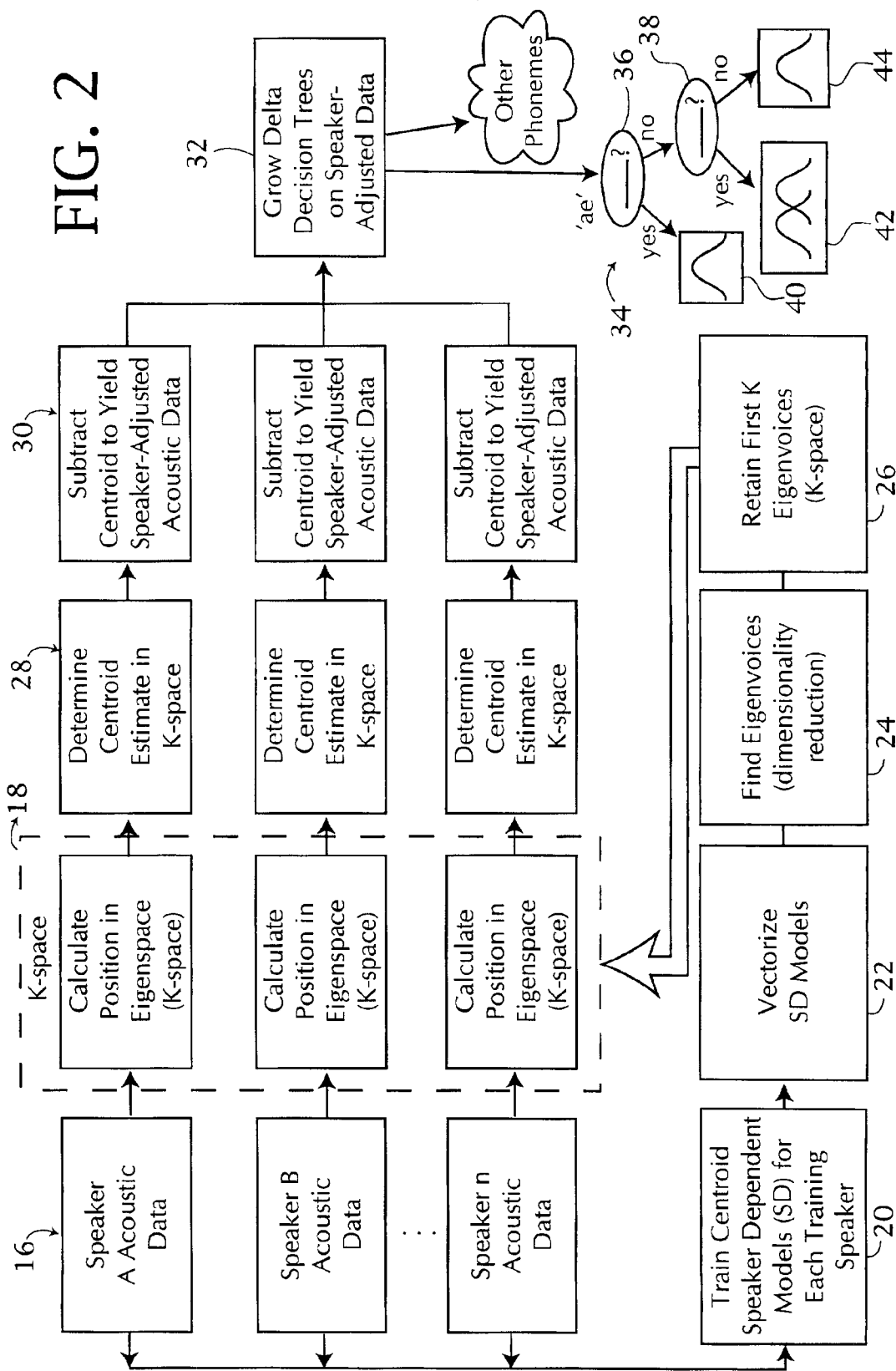
FIG. 2 is a block diagram of a first presently preferred embodiment called the eigen centroid plus delta tree embodiment.
Figure 3:
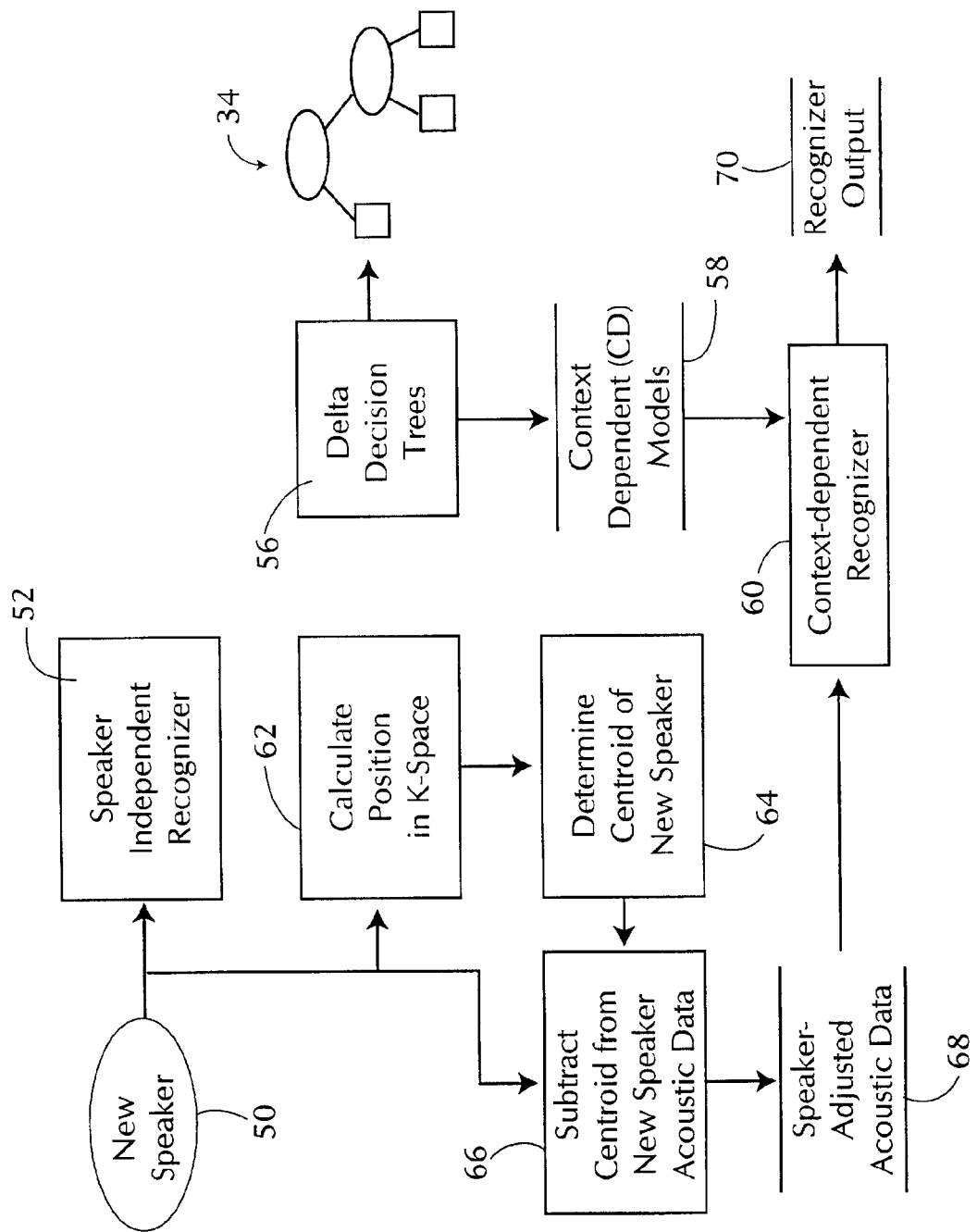
FIG. 3 illustrates one embodiment of a speech recognizer that utilizes the delta decision trees developed by the embodiment illustrated in FIG. 2.
Figure 4:
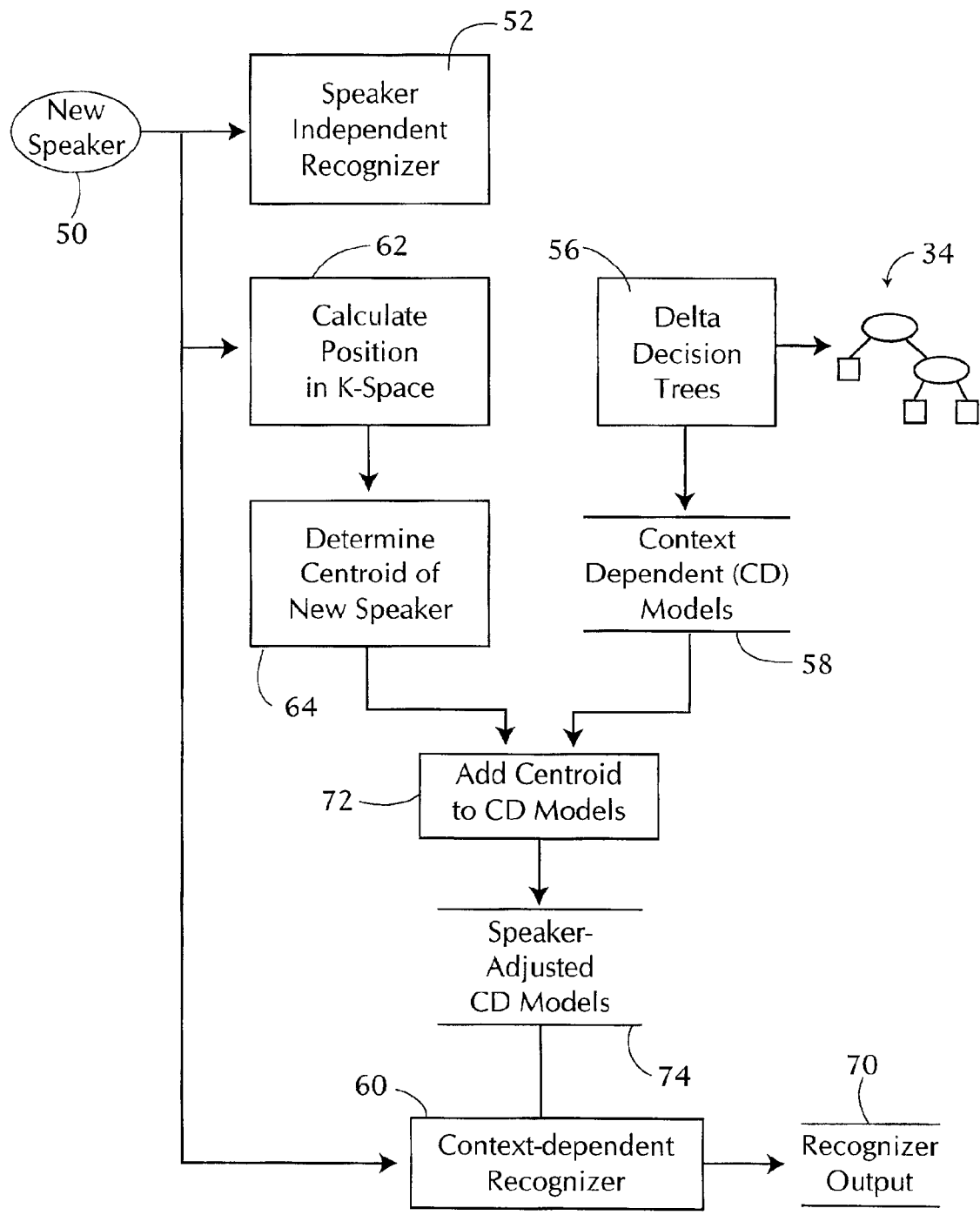
FIG. 4 is another embodiment of speech recognizer that also uses the delta decision trees generated by the embodiment of FIG. 2.

FIG. 2 illustrates a presently preferred first embodiment that we call the Eigen centroid plus delta tree embodiment. More specifically, FIG. 2 shows the preferred steps for training the delta trees that are then used by the recognizer. FIGS. 3 and 4 then show alternate embodiments for use of that recognizer with speech supplied by a new speaker.

Referring to FIG. 2, the delta decision trees used by this embodiment may be grown by providing acoustic data from a plurality of training speakers, as illustrated at 16. The acoustic data from each training speaker is projected or placed into an eigenspace 18. In the presently preferred embodiment the eigenspace can be truncated to reduce its size and computational complexity. We refer here to the reduced size eigenspace as K-space.

One procedure for creating eigenspace 18 is illustrated by steps 20–26. The procedure uses the training speaker acoustic data 16 to generate speaker dependent (SD) models for each training speaker, as depicted at step 20. These models are then vectorized at step 22. In the presently preferred embodiment, the speaker dependent models are vectorized by concatenating the parameters of the speech models of each speaker. Typically Hidden Markov Models are used, resulting in a supervector for each speaker that may comprise an ordered list of parameters (typically floating point numbers) corresponding to at least a portion of the parameters of the Hidden Markov Models for that speaker. The parameters may be organized in any convenient order. The order is not critical; however, once an order is adopted it must be followed for all training speakers. Next, a dimensionality reduction step is performed on the supervectors at step 24 to define the eigenspace. Dimensionality reduction can be effected through any linear transformation that reduces the original high-dimensional supervectors into basis vectors. A non-exhaustive list of dimensionality reduction techniques includes: Principal Component Analysis (PCA), Independent Component Analysis (ICA), Linear Discriminate Analysis (LDA), Factor Analysis (FA) and Singular Value Decomposition (SVD).

The basis vectors generated at step 24 define an eigenspace spanned by the eigenvectors. Dimensionality reduction yields one eigenvector for each one of the training speakers. Thus if there are n training speakers, the dimensionality reduction step 24 produces n eigenvectors. These eigenvectors define what we call eigenvoice space or eigenspace.

The eigenvectors that make up the eigenspace each represent a different dimension across which different speakers may be differentiated. Each supervector in the original training set can be represented as a linear combination of these eigenvectors. The eigenvectors are ordered by their importance in modeling the data: the first eigenvector is more important than the second, which is more important than the third, and so on.

Although a maximum of n eigenvectors is produced at step 24, in practice, it is possible to discard several of these eigenvectors, keeping only the first K eigenvectors. Thus at step 26 we optionally extract K of the n eigenvectors to comprise a reduced parameter eigenspace or K-space. The higher order eigenvectors can be discarded because they typically contain less important information with which to discriminate among speakers. Reducing the eigenvoice space to fewer than the total number of training speakers helps to eliminate noise found in the original training data, and also provides an inherent data compression that can be helpful when constructing practical systems with limited memory and processor resources. At step 26 we may also optionally apply a re-estimation technique such as maximum likelihood eigenspace (MLES) to get a more accurate eigenspace.

Having constructed the eigenspace 18, the acoustic data of each individual training speaker is projected or placed in eigenspace as at 28. The location of each speaker's data in eigenspace (K-space) represents each speaker's centroid or average phoneme pronunciation. As illustrated in FIG. 1, these centroids may be expected to differ from speaker to speaker. Speed is one significant advantage of using the eigenspace technique to determine speaker phoneme centroids.

The presently preferred technique for placing each speaker's data within eigenspace involves a technique that we call the Maximum Likelihood Estimation Technique (MLED). In practical effect, the Maximum Likelihood Technique will select the supervector within eigenspace that is most consistent with the speaker's input speech, regardless of how much speech is actually available.

To illustrate, assume that the speaker is a young female native of Alabama. Upon receipt of a few uttered syllables from this speaker, the Maximum Likelihood Technique will select a point within eigenspace that represents all phonemes (even those not yet represented in the input speech) consistent with this speaker's native Alabama female accent.

The Maximum Likelihood Technique employs a probability function Q that represents the probability of generating the observed data for a predefined set of Hidden Markov Models. Manipulation of the probability function Q is made easier if the function includes not only a probability term P but also the logarithm of that term, log P. The probability function is then maximized by taking the derivative of the probability function individually with respect to each of the eigenvalues. For example, if the eigenspace is of dimension 100 this system calculates 100 derivatives of the probability function Q, setting each to zero and solving for the respective eigenvalue W.

The resulting set of Ws, so obtained, represents the eigenvalues needed to identify the point in eigenspace that corresponds to the point of maximum likelihood. Thus the set of Ws comprises a maximum likelihood vector in eigenspace. This maximum likelihood vector may then be used to construct a supervector that corresponds to the optimal point in eigenspace.

In the context of the maximum likelihood framework of the invention, we wish to maximize the likelihood of an observation O with regard to a given model. This may be done iteratively by maximizing the auxiliary function Q presented below.

$$Q(\lambda, \hat{\lambda}) = \sum_{\theta \in \text{states}} P(O, \theta | \lambda) \log[P(O, \theta | \hat{\lambda})]$$

where $\lambda$ is the model and $\hat{\lambda}$ is the estimated model.

As a preliminary approximation, we might want to carry out a maximization with regards to the means only. In the context where the probability P is given by a set of HMMs, we obtain the following:

$$Q(\lambda, \hat{\lambda}) =$$

$$\text{const} - \frac{1}{2} P(O | \lambda) \sum_{\substack{\text{states} \\ \text{in } \lambda}}^{S_\lambda} \sum_{\substack{\text{mixt} \\ \text{gauss} \\ \text{in } S}}^{M_s} \sum_{\text{time } t}^{T} \{\gamma_m^{(s)}(t)[n\log(2\pi) + \log|C_m^{(s)}| + h(o_t, m, s)]\}$$

where:

$$h(o_t, m, s) = (o_t - \hat{\mu}_m^{(s)})^T C_m^{(s)-1} (o_t - \hat{\mu}_m^{(s)})$$

and let:
$O_t$ be the feature vector at time t
$C_m^{(s)-1}$ be the inverse covariance for mixture Gaussian m of state s
$\hat{\mu}_m^{(s)}$ be the approximated adapted mean for state s, mixture component m
$\gamma_m^{(s)}(t)$ be the P(using mix Gaussian m|$\lambda, o_t$)

Suppose the Gaussian means for the HMMs of the new speaker are located in eigenspace. Let this space be spanned by the mean supervectors $\bar{\mu}_j$ with j=1 . . . E, $$\bar{\mu}_j = \begin{bmatrix} \bar{\mu}_1^{(1)}(j) \\ \bar{\mu}_2^{(1)}(j) \\ \vdots \\ \bar{\mu}_m^{(s)}(j) \\ \bar{\mu}_{M_{S_\lambda}}^{(S_\lambda)}(j) \end{bmatrix}$$

where $\bar{\mu}_m^{(s)}(j)$ represents the mean vector for the mixture Gaussian m in the state s of the eigenvector (eigenmodel) j.

Then we need:

$$\hat{\mu} = \sum_{j=1}^{E} w_j \bar{\mu}_j$$

The $\bar{\mu}_j$ are orthogonal and the $w_j$ are the eigenvalues of our speaker model. We assume here that any new speaker can be modeled as a linear combination of our database of observed speakers. Then $$\hat{\mu}_m^{(s)} = \sum_{j=1}^{E} w_j \bar{\mu}_m^{(s)}(j)$$

with s in states of λ, m in mixture Gaussians of M.

Since we need to maximize Q, we just need to set $$\frac{\partial Q}{\partial w_e} = 0, e = 1 \ldots E.$$

(Note that because the eigenvectors are orthogonal, $$\frac{\partial w_i}{\partial w_j} = 0, i \neq j \ldots)$$

Hence we have $$\frac{\partial Q}{\partial w_e} = 0 = \sum_{\substack{\text{states}\\ \text{in } \lambda}}^{S_\lambda} \sum_{\substack{\text{mixt}\\ \text{gauss}\\ \text{in } S}}^{M_s} \sum_{t}^{T} \left\{ \frac{\partial}{\partial w_e} \gamma_m^{(s)}(t) h(o_t, s) \right\}, e = 1 \ldots E.$$

Computing the above derivative, we have:

$$0 = \sum_{s} \sum_{m} \sum_{t} \gamma_m^{(s)}(t) \left\{ -\bar{\mu}_m^{(s)T}(e) C_m^{(s)-1} o_t + \sum_{j=1}^{E} w_j \bar{\mu}_m^{(s)T}(j) C_m^{(s)-1} \bar{\mu}_m^{(s)}(e) \right\}$$

from which we find the set of linear equations $$\sum_{s} \sum_{m} \sum_{t} \gamma_m^{(s)}(t) \bar{\mu}_m^{(s)T}(e) C_m^{(s)-1} o_t =$$

$$\sum_{s} \sum_{m} \sum_{t} \gamma_m^{(s)}(t) \sum_{j=1}^{E} w_j \bar{\mu}_m^{(s)T}(j) C_m^{(s)-1} \bar{\mu}_m^{(s)}(e), e = 1 \ldots E.$$

Once the centroids for each speaker have been determined, they are subtracted at step 30 to yield speaker-adjusted acoustic data. Referring to FIG. 1, this centroid subtraction process will tend to move all speakers within speaker space so that their centroids are coincident with one another. This, in effect, removes the speaker idiosyncrasies, leaving only the allophone-relevant data.

After all training speakers have been processed in this fashion, the resulting speaker-adjusted training data is used at step 32 to grow delta decision trees as illustrated diagrammatically at 34. A decision tree is grown in this fashion for each phoneme. The phoneme 'ae' is illustrated at 34. Each tree comprises a root node 36 containing a question about the context of the phoneme (i.e., a question about the phoneme's neighbors or other contextual information). The root node question may be answered either "yes" or "no", thereby branching left or right to a pair of child nodes. The child nodes can contain additional questions, as illustrated at 38, or a speech model, as illustrated at 40. Note that all leaf nodes (nodes 40, 42, and 44) contain speech models. These models are selected as being the models most suited for recognizing a particular allophone. Thus the speech models at the leaf nodes are context-dependent.

After the delta decision trees have been developed, as illustrated in FIG. 1, the system may be used to recognize the speech of a new speaker. Two recognizer embodiments will now be described with reference to FIGS. 3 and 4. The recognizer embodiments differ essentially in whether the new speaker centroid is subtracted from the acoustic data prior to context-dependent recognition (FIG. 3); or whether the centroid information is added to the context-dependent models prior to context-dependent recognition (FIG. 4).

Referring to FIG. 3, the new speaker 50 supplies an utterance that is routed to several processing blocks, as illustrated. The utterance is supplied to a speaker-independent recognizer 52 that functions simply to initiate the MLED process.

Before the new speaker's utterance is submitted to the context-dependent recognizer 60, the new speaker's centroid information is subtracted from the speaker's acoustic data. This is accomplished by calculating the position of the new speaker within the eigenspace (K-space) as at 62 to thereby determine the centroid of the new speaker as at 64. Preferably the previously described MLED technique is used to calculate the position of the new speaker in K-space.

Having determined the centroid of the new speaker, the centroid data is subtracted from the new speaker's acoustic data as at 66. This yields speaker-adjusted acoustic data 68 that is then submitted to the context-dependent recognizer 60.

The alternate embodiment illustrated at FIG. 4 works in a somewhat similar fashion. The new speaker's utterance is submitted to the speaker-independent recognizer 52 as before, to initiate the MLED process. Of course, if the MLED process is not being used in a particular embodiment, the speaker-independent recognizer may not be needed.

Figure 5:
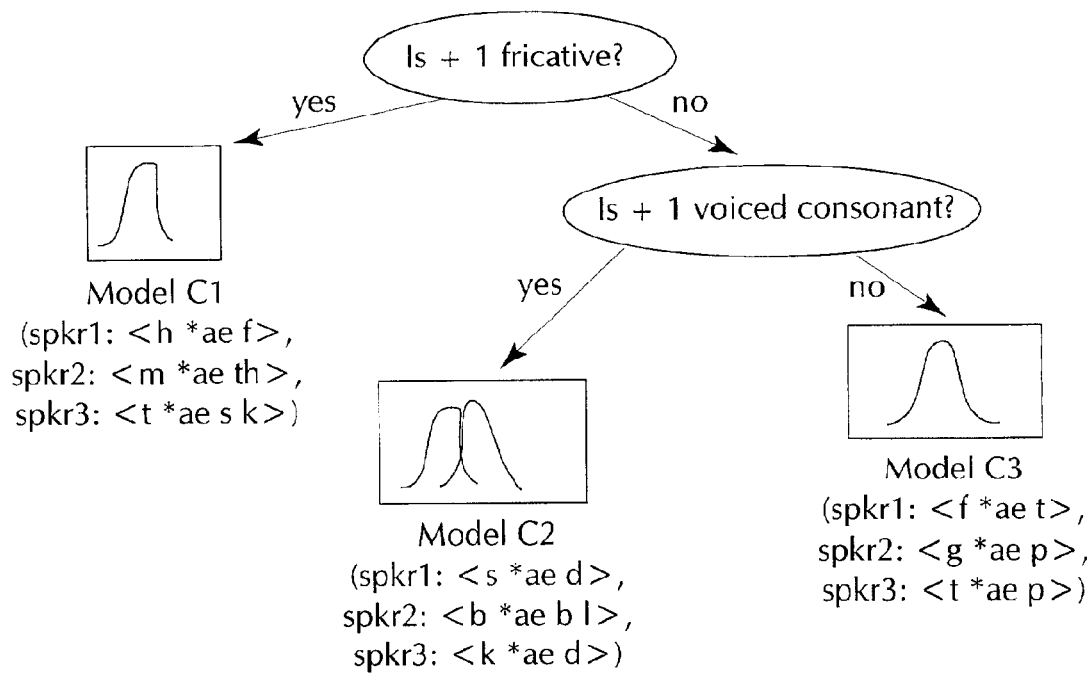
FIG. 5 illustrates how a delta tree might be constructed using the speaker-adjusted data generated by the embodiment of FIG. 2.
Figure 6:
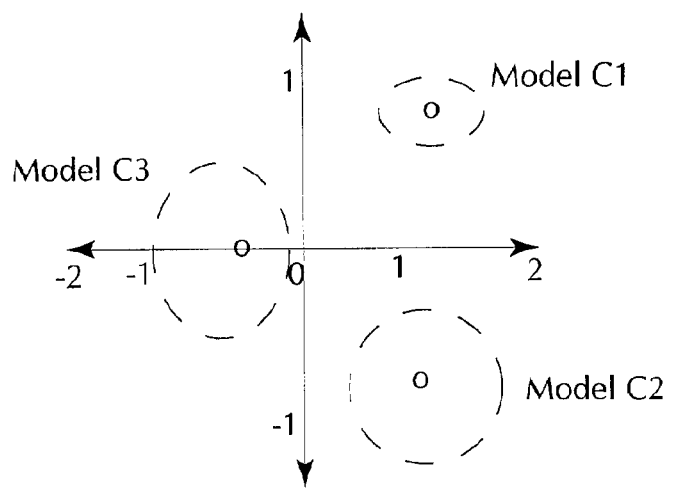
FIG. 6 shows the grouping of speaker-adjusted data in acoustic space corresponding to the delta tree of FIG. 5.

Meanwhile, the new speaker's utterance is placed into eigenspace as at step 62 to determine the centroid of the new speaker as at 64. The centroid information is then added to the context-dependent models as at 72 to yield a set of speaker-adjusted context-dependent models 74. These speaker-adjusted models are then used by the context-dependent recognizer 60 in producing the recognizer output 70. Table I below shows how exemplary data items for three speakers may be speaker-adjusted by subtracting out the centroid. All data items in the table are pronunciations of the phoneme 'ae' (in a variety of contexts). FIG. 5 then shows how a delta tree might be constructed using this speaker-adjusted data. FIG. 6 then shows the grouping of the speaker-adjusted data in acoustic space. In FIG. 6 +1 means next phoneme; the fricatives are the set of phonemes {f, h, s, th, . . . }; voiced consonants are {b, d, g, . . . }.

TABLE I

| Spkr1: centroid = (2, 3) | | | | |
|---|---|---|---|---|
| "half" => <h *ae f> | (3, 4) | − (2, 3) | = (1, 1) |
| "sad" => <s *ae d> | (2, 2) | − (2, 3) | = (0, −1) |
| "fat" => <f *ae t> | (1.5, 3) | − (2, 3) | = (−0.5, 0) |
| Spkr2: centroid = (7, 7) | | | | |
| "math" => <m *ae th> | (8, 8) | − (7, 7) | = (1, 1) |
| "babble" => <b *ae b l> | (7, 6) | − (7, 7) | = (0, −1) |
| "gap" => <g *ae p> | (6.5, 7) | − (7, 7) | = (−0.5, 0) |
| Spkr3: centroid = (10, 2) | | | | |
| "task" => <t *ae s k> | (11, 3) | − (10, 2) | = (1, 1) |
| "cad" => <k *ae d> | (10, 1) | − (10, 2) | = (0, −1) |
| "tap" => <t *ae p> | (9.5, 2) | − (10, 2) | = (−0.5, 0) |

Figure 7:
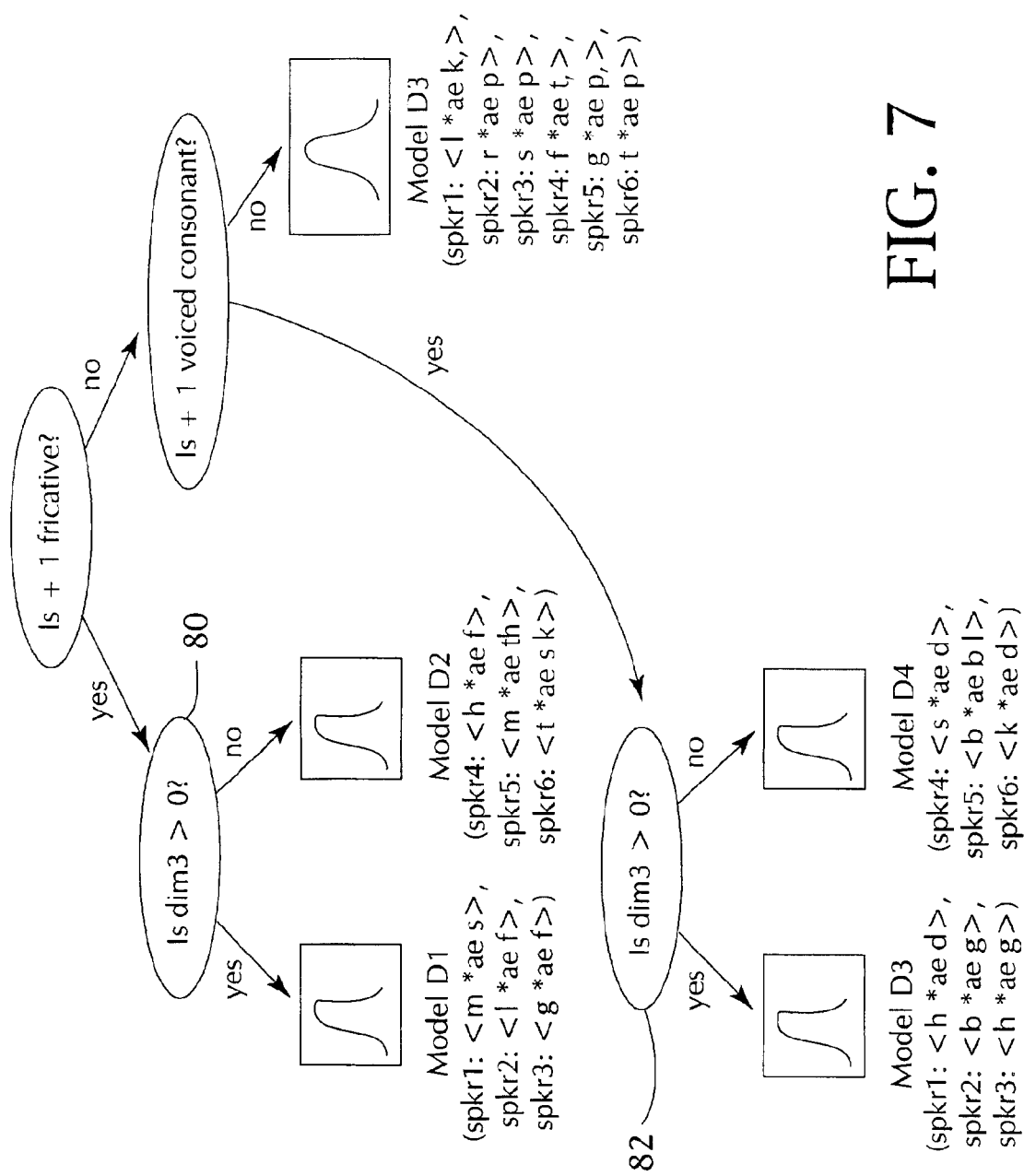
FIG. 7 illustrates an exemplary delta decision tree that includes questions about the eigenspace dimensions.

As previously noted, co-articulation can be affected by speaker type in a way that causes the direction of the allophone vectors to differ. This was illustrated in FIG. 1 wherein the angular relationships of offset vectors differed depending on whether the speaker was from the north or from the south. This phenomenon may be taken into account by including decision tree questions about the eigen dimensions. FIG. 7 shows an exemplary delta decision tree that includes questions about the eigen dimensions in determining which model to apply to a particular allophone. In FIG. 7, questions 80 and 82 are eigen dimension questions. The questions ask whether a particular eigen dimension (in this case dimension 3) is greater than zero. Of course, other questions can also be asked about the eigen dimension.

The Re-Estimation Technique

In the preceding example, an eigenspace was generated from training speaker data, with the speaker-dependent (context-independent) component of the speech model being represented by the eigencentroid, and the speaker-independent (context-dependent) component being represented as an offset. The presently preferred embodiment stores the offset in a tree data structure which is traversed based on the allophone context. However, other data structures may also be used to store the offset component.

The present invention employs a re-estimation technique that greatly improves the separation of the speaker-dependent and speaker-independent components. The re-estimation technique thus minimizes the effect of context-dependent variation on the speaker-dependent eigenspace, even when the amount of training data per speaker is small. The technique also minimizes the effect of context-dependent variation during adaptation.

The re-estimation technique relies upon several re-estimation equations that are reproduced below. Separate re-estimation equations are provided to adjust the centroids, the eigenspace, and the offsets. As expressed in these equations, the results of centroid re-estimation are fed to the eigenspace and offset re-estimation processes. The results of eigenspace re-estimation are fed to the centroid and offset re-estimation processes. Furthermore, the results of offset re-estimation are fed to the centroid and eigenspace re-estimation processes. Thus in the preferred embodiment each re-estimation process provides feedback to the other two.

The re-estimation processes are performed by maximizing the likelihood of the observations given the model:

$$\lambda = \arg\max_{\lambda \in \Omega} L(O \mid \lambda) \text{ where}$$

o is the adaptation utterance
Ω is where the model is constrained and
λ is the set of parameters.

The likelihood can be indirectly optimized by iteratively increasing the auxiliary function Q:

$$Q(\lambda, \hat{\lambda}) = \sum_{\theta \in states} L(O, \theta \mid \lambda) \log[L(O, \theta \mid \hat{\lambda})]$$

In the preferred maximum likelihood framework, we maximize the likelihood of the observations given in the case where we want to re-estimate the means, and variances of the Gaussians we have to optimize:

$$Q = \sum_{s,p,d,t} \gamma_{p,d}^s(t) \times \{h(o_t, s, p, d) + \log|C_{p,d}^{-1}|\}$$

where $$h(o_t, s, p, d) = (o_t - \hat{m}_{p,d}^s)^T C_{p,d}^{-1} (o_t - \hat{m}_{p,d}^s)$$

and let s be a speaker, p be a phoneme (or more generally, an acoustic class), d be a distribution in p, and $o_t$ be the feature vector at time t, $C_{p,d}^{-1}$ be the inverse covariance (precision matrix) for distribution d of phoneme p, $\hat{m}_{p,d}^s$ be the approximated adapted mean for distribution d of phoneme p of speaker q, $\gamma_{p,d}^s(t)$ be equal to the L(speaker S using dat time t|O,λ)

To introduce separate inter-speaker variability and intra-speaker variability (mainly context dependency) we can express the speech models as having a speaker dependent component and a speaker independent component as follows:

$$m_{p,d}^s = \mu_p^s + \delta_{p,d}$$

where $\mu_p^s$ models the speaker-dependent part and is the location of the phoneme p of speaker s in the speaker space. This component is also called the centroid.

$\delta_{p,d}$ models the speaker-independent offset. In the presently preferred implementation offsets are stored in a tree structure comprising a plurality of leaves, each containing offset data corresponding to a given allophone in a given context. Thus $\delta_{p,d}$ is referred to as the delta-trees component.

The eigenvoice framework may then be applied to the preceding formula, by writing the centroid $\mu^s$ as the linear combination of a small number of eigenvectors, where E is the number of dimensions in the eigenspace:

$$\mu_p^s = e_p(o) + \sum_{j=1}^{E} w_s(j) e_p(j)$$

The centroid $\mu^s$ lies in a constrained space obtained via a dimensionality reduction technique from training speaker data.

The mean of speaker S may thus be expressed as:

$$m_{p,d}^s = e_p(0) + \sum_{j=1}^{E} w_s(j) e_p(j) + \delta_{p,d}$$

Eigencentroid Re-Estimation

To re-estimate training speaker eigencentroids, assume fixed δs and e's. Set $$\frac{\partial Q}{\partial w_s(j)} = 0, j = 1, \ldots, E.$$

We derive the formula $$\sum_{p,d,t} \gamma_{p,d}^s(t) e_p^T(j) C_{p,d}^{-1} (o_t - \delta_{p,d}) = \qquad \text{(Equation 1)}$$

$$\sum_{p,d,t} \gamma_{p,d}^s(t) e_p^T(j) C_{p,d}^{-1} \sum_{k=1}^{E} w_s(k) e_p(k),$$

for $j = 1, \ldots E$.

This gives new coordinates $w_s(1), \ldots, w_s(E)$ for each s (and thus a new $\hat{\mu}_p^s$ for each s).

Note that precisely the same formula will be used to find the centroid for a new speaker at adaptation. For instance, for unsupervised adaptation, an SI recognizer would be used to find initial occupation probabilities γ for the speaker, leading to an initial estimate of the centroid μ. In combination with the SI δ trees, this would define an adapted CD model for the current speaker, yielding more accurate γ's which could be re-estimated iteratively to give an increasingly accurate model for the speaker.

Eigenspace Re-Estimation

To re-estimate the eigenvectors spanning the eigenspace, assume fixed w's and δs. Set $$\frac{\partial Q}{\partial e_p(j)} = 0, j = 1, \ldots, E.$$

We derive the formula $$\left[\sum_s (w_s(j))^2 \sum_{d,t} \gamma_{p,d}^s(t) C_{p,d}^{-1}\right] \qquad \text{(Equation 2)}$$

$$e_p(j) = \sum_{s,p,d} \gamma_{p,d}^s(t) w_s(j) C_{p,d}^{-1} (o_t - \tilde{\mu}_p^s(j) - \delta_{p,d}),$$

$j = 1, \ldots E$ where $$\tilde{\mu}_p^s(j) = \sum_{k \neq j} w_s(k) e_p(k).$$

Delta-tree Re-Estimation

If we wish to re-estimate the δ's without changing the tree structure, we can use the following. Assume that the W's and e's are fixed, and set $$\frac{\partial Q}{\partial \delta_{p,d}} = 0.$$

We obtain the formula $$\delta_{p,d} = \frac{\sum_{s,t} \gamma_{p,d}^s(t)(o_t - \hat{\mu}_{p,d}^s)}{\sum_{s,t} \gamma_{p,d}^s(t)} \qquad \text{(Equation 3)}$$

Let us assume in the following that the precision matrix $C_{p,d}^{-1}$ is diagonal and that $\sigma_{p,d}^s(i)$ is the i-th term on the diagonal of $C_{p,d}^{-1}$. If we want to re-estimate the variances $\sigma_{p,d}^2(i)$, we set $$\frac{\partial Q}{\partial \sigma_{p,d}^2(i)} = 0.$$

We derive the formula $$\sigma_{p,d}^2(i) = \frac{\sum_{s,t} \gamma_{p,d}^s(t)(o_t(i) - \hat{m}_{p,d}^s(i))^2}{\sum_{s,t} \gamma_{p,d}^s(t)} \qquad \text{(Equation 4)}$$

Figure 8:
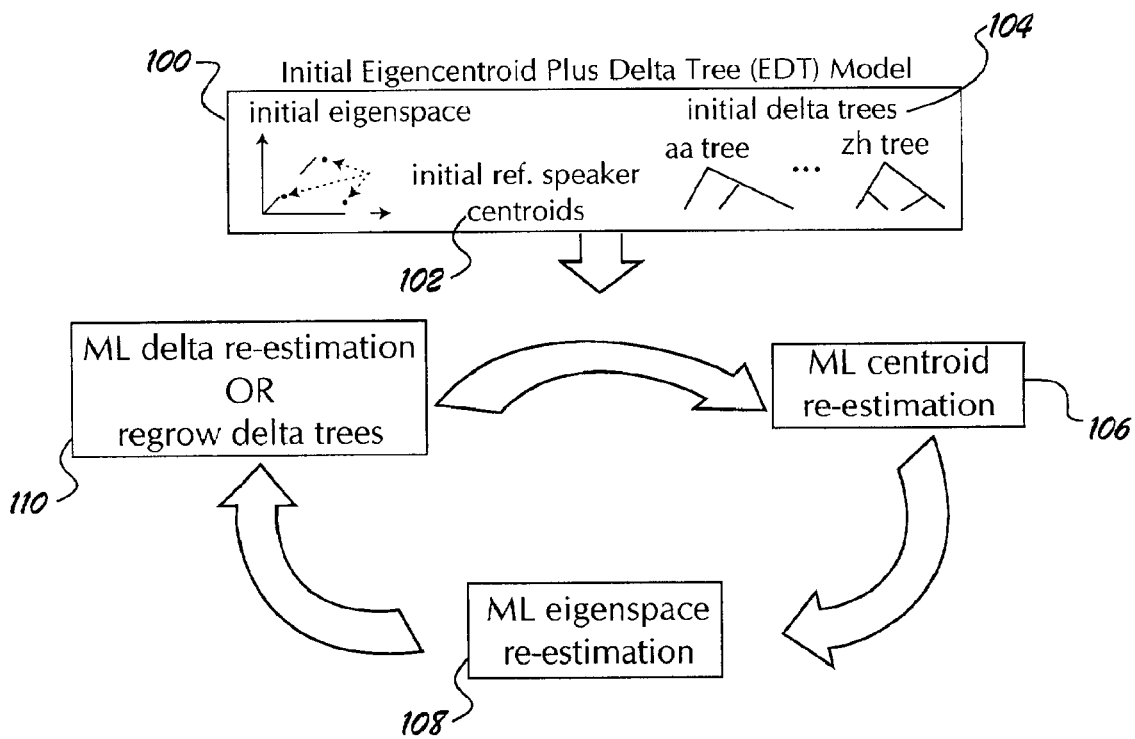
FIG. 8 is a flow diagram illustrating one exemplary use of the re-estimation technique for developing improved speech models.

Thus Equation (1) above represents the re-estimation formula for re-estimating the centroids in accordance with the preferred embodiment of the invention. Equation (2) above represents the re-estimation formula for re-estimating the eigenspace or eigenvectors in accordance with the preferred embodiment of the invention. Finally, Equation (3) and (4) above represents the re-estimation formula for re-estimating the offsets in accordance with the preferred embodiment of the invention. Note that in the preceding equations we have made the assumption that the speaker dependent and speaker independent components are independent from one another. This implies that the direction of the offsets does not depend on the speaker centroid location in the eigenspace. As FIG. 8 shows, we may also regrow the δ-trees as part of the re-estimation procedure.

The re-estimation process expressed in the above equations generates greatly improved speech models by better separating the context-independent (speaker-dependent) and context-independent (speaker-independent) components. The re-estimation process removes unwanted artifacts and sampling effects that result because the initial eigenspace was grown for context-independent models before the system had adequate information about context dependency. Thus there may be unwanted context-dependent effects in the initial eigenspace. This can happen, for example, where there is insufficient training speech to adequately represent all of the allophones. In such case, some context-induced effects may be interpreted as speaker-dependent artifacts, when they are actually not. The re-estimation equations remove these unwanted effects and thus provide far better separation between the speaker-independent and speaker-dependent components.

For instance, consider set SI of training speakers whose data happen to contain only examples of phoneme aa preceding fricatives, and set S2 whose examples of aa always precede non-fricatives. Since the procedure for estimating the eigenspace only has information about the mean feature vectors for aa for each speaker, it may "learn" that S1 and S2 are two different speaker types, and yield a coordinate vector that correlates strongly with membership in S1 or S2, thus wrongly putting context dependent information in the μ component. Note that context dependent effects may be considerably more powerful than speaker dependent ones, increasing the risk that this kind of error will occur while estimating the eigenspace.

The re-estimation equations expressed above cover the case where a context dependent phoneme M(S,C,P) (where S is current speaker, P the phoneme, and C the phonetic context) can be expressed as M(S,C,P)=MU(S,P)+DELTA (P,C). This is a special case of the more general case where M(S,C,P)=T(P,C)*MU(S,P)+Δ(P,C), where MU( ) lies in the eigenspace as before and is speaker-dependent, and T(P,C) is a context-dependent, speaker-independent linear transformation applied to MU( ).

To implement the more general case, the use of the re-estimation equations would be exactly as before; the equations would merely be slightly more general, as set forth below. The initialization would also be slightly different as will now be described.

In this case, each speaker-independent model is represented by a linear transformation T. In the preferred embodiment, one grows a decision tree, each of whose leaves represents a particular phonetic context. To find the transformation T(I) associated with a leaf I, consider all the training speaker data that belongs in that leaf. If speakers $s_1$, ... $s_n$ have data that can be assigned to that leaf each speaker has a portion of his or her centroid vector corresponding to the phoneme p modeled by that tree: $\bar{c}(s_1), \ldots \bar{c}(s_n)$. One then finds the matrix T such that the model $T*\bar{c}(s_1)$ is as good a model as possible for the data from $s_1$ that has ended up in leaf I, and such that $T*\bar{c}(s_2)$ is as good a model as possible for the data from $s_2$ that has ended up in I, and so on. Our currently preferred criterion of goodness of a model is the maximum likelihood criterion (calculated over all speakers $s_1 \ldots s_n$).

FIG. 8 shows one implementation of the re-estimation technique in which the re-estimation process is performed cyclically or iteratively. We have found the iterative approach to produce the best results. Iteration is not required, however. Acceptable results may be achieved by applying some of the re-estimation formulas only once in a single pass. In this minimal, single pass case, the centroid would be re-estimated and the eigenspace would be re-estimated, but re-estimation of the offsets could be dispensed with.

Referring to FIG. 8, the re-estimation process begins with an initial eigenspace 100, and an initial set of reference speaker centroids 102 and offsets 104. If desired the offsets may be stored in tree structures, typically one tree structure for each phoneme, with branches of the tree designating the various allophonic contexts. Using the maximum likelihood re-estimation formulas reproduced below, a cyclic re-estimation process is performed on the centroids, as at 106, on the eigenspace, as at 108 and on the offsets (contained within the trees) as at 110.

Use of Re-estimation at Adaptation Time

While the re-estimation formulas described above are very beneficial in developing speech models at training time, the re-estimation formulas have other beneficial uses as well. One such use is at adaptation time, where speech models are adapted to a particular speaker. For this purpose, the speech models being adapted may be generated using the re-estimation formulas, as described above, or the speech models may be used without re-estimation.

The new speaker provides an utterance, which is then labeled using supervised input or any speech recognizer (e.g., a speaker independent recognizer). Labeling the utterance allows the system to classify which uttered sounds correspond to which phonemes in which contexts. Supervised input involves prompting the speaker to utter a predetermined phrase; thus the system "knows" what was uttered, assuming the speaker has complied with the prompting instructions. If input is not prompted, labeling can be carried out by a speech recognizer that labels the provided utterance without having a priori knowledge of what was uttered.

Using the centroid re-estimation formula, each phoneme uttered by the new speaker is optimized. For each phoneme uttered, the position in the eigenspace is identified that yields the maximum probability of corresponding to the labeled utterance provided. Given a few seconds of speech, the system will thus find the position that maximizes the likelihood that exactly the sounds uttered were generated and no others. The system thus produces a single point in the eigenspace for each phoneme that represents the system's optimal "guess" at what the speaker's average phoneme vector is. For this use the eigenspace and offset information are fixed.

The re-estimation formula generates a new centroid for each phoneme. These are then used to form new speech models. If desired, the process may be performed iteratively. In such case, the observed utterance is re-labeled, an addition pass of centroid re-estimation is performed, and new models are then calculated.

Performing Speaker Identification And Verification Using The Eigencentroid With Linear Transformation And Re-estimation Procedures Another beneficial use of the eigencentroid plus offset technique (with or without re-estimation) is in speaker identification and speaker verification. As noted above, the eigenspace, centroid and offset speech models separate speech into speaker-independent and speaker-dependent components that can be used to accentuate the differences between speakers. Because the speaker-independent and speaker-dependent components are well separated, the speaker-dependent components can be used for speaker identification and verification purposes.

Figure 9:
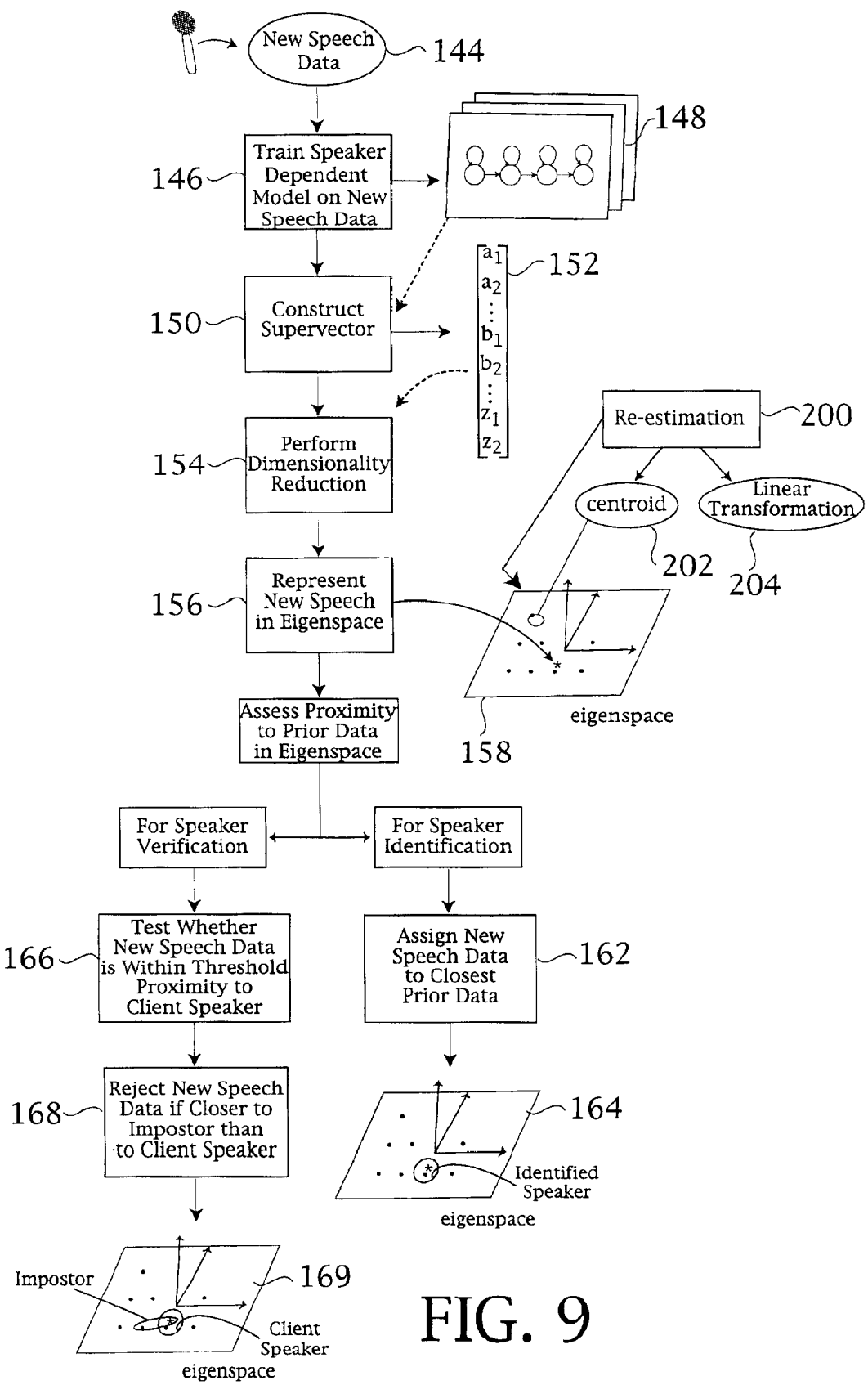
FIG. 9 is a flow diagram illustrating speaker verification and speaker identification using the re-estimation techniques.

FIG. 9 shows an exemplary system for performing both speaker verification and speaker identification using the principles of the invention. The user seeking speaker identification or verification services supplies new speech data at 144 and these data are used to train a speaker dependent model as indicated at step 146. The model 148 is then used at step 150 to construct a supervector 152. Note that the new speech data may not necessary include an example of each sound unit. For instance, the new speech utterance may be too short to contain examples of all sound units. The system will handle this as will be more fully explained below.

Dimensionality reduction is performed at step 154 upon the supervector 152, resulting in a new data point that can be represented in eigenspace as indicated at step 156 and illustrated at 158. In the illustration at 158, the previously acquired points in eigenspace (based on training speakers) are represented as dots whereas the new speech data point is represented by a star. The re-estimation process 200 may be applied by operating upon the eigenspace 158, the centroids 202 and the linear transformation or offset 204, as illustrated.

Having placed the new data point in eigenspace, it may now be assessed with respect to its proximity to the other prior data points or data distributions corresponding to the training speakers. FIG. 9 illustrates an exemplary embodiment of both speaker identification and speaker verification.

For a speaker identification, the new speech data is assigned to the closest training speaker in eigenspace, step 162 diagrammatically illustrated at 164. The system will thus identify the new speech as being that of the prior training speaker whose data point or data distribution lies closest to the new speech in eigenspace.

For speaker verification, the system tests the new data point at step 166 to determine whether it is within a predetermined threshold proximity to the client speaker in eigenspace. As a safeguard the system may, at step 168, reject the new speaker data if it lies closer in eigenspace to an imposter than to the client speaker. This is diagrammatically illustrated at 169, where the proximity to the client speaker and the proximity to the closest impostor have been depicted.

Such a system would be especially useful for text-independent speaker identification or verification, where the speech people give when they first enroll in the system may be different from the speech they produce when the system is verifying or identifying them. The eigencentroid plus offset technique automatically compensates for differences between enrollment and test speech by taking phonetic context into account. The re-estimation procedure, although optional, proves even better separation and hence a more discriminating speaker identification or verification system. For a more detailed discussion of the basic speaker identification and speaker verification problems, see U.S. Pat. No. 6,141,644, entitled "Speaker Verification and Speaker Identification Based on Eigenvoices."

What is claimed is:

1. A method for developing context dependent acoustic models, comprising the steps of:
  developing a low-dimensional space from training speech data obtained from a plurality of training speakers by constructing an eigenspace from said training speech data;
  representing the training speech data from each of said plurality of training speakers as the combination of a speaker dependent component and a speaker independent component;
  representing said speaker dependent component as centroids within said low-dimensional space;
  representing said speaker independent component as linear transformations of said centroids; and
  performing maximum likelihood re-estimation on said training speech data of at least one of said low-dimensional space, said centroids, and said linear transformations to represent context dependent acoustic model.

2. The method of claim 1 wherein said training speech data is separated by identifying context dependent data and using said context dependent data to identify said speaker independent data.

3. The method of claim 1 wherein said training speech data is separated by identifying context independent data and using said context independent data to identify said speaker dependent data.

4. The method of claim 1 wherein said maximum likelihood re estimation step is performed iteratively.

5. The method of claim 1 wherein said linear transformations are effected as an offsets from said centroids.

6. The method of claim 1 wherein said maximum likelihood re-estimation step generates a re-estimated low-dimensional space, re-estimated centroids and re-estimated offsets and wherein said context dependent acoustic models are constructed using said re-estimated low-dimensional space and said re-estimated offsets.

7. The method of claim 1 wherein said linear transformations of said centroids are represented in tree data structures corresponding to individual sound units.

8. The method of claim 5 wherein said offsets are represented in tree data structures corresponding to individual sound units.

9. The method of claim 1 further comprising:
  using said speaker dependent component to perform speaker verification.

10. The method of claim 1 further comprising:
  using said speaker dependent component to perform speaker identification.

11. A method for developing context dependent acoustic models, comprising the steps of:
  developing a low-dimensional space from training speech data obtained from a plurality of training speakers by constructing an eigenspace from said training speech data;
  representing the training speech data from each of said plurality of training speakers as the combination of a speaker dependent component and a speaker independent component;
  representing said speaker dependent component as centroids within said low-dimensional space;
  representing said speaker independent component as linear transformations of said centroids; and
  performing maximum likelihood re-estimation on said training speech data of at least one of said low-dimensional space, said centroids, and said linear transformations to represent context dependent acoustic model, wherein said linear transformations are effected as offsets from said centroids, said maximum likelihood re-estimation step generates a re-estimated low-dimensional space, re-estimated centroids and re-estimated offsets and wherein said context dependent acoustic mociels are constructed using said re-estimated low-dimensional space and said re-estimated offsets.

12. The method of claim 11 wherein said linear transformations of said centroids are represented in tree data structures corresponding to individual sound units.

13. The method of claim 11 wherein said offsets are represented in tree data structures corresponding to individual sound units.

14. The method of claim 11 further comprising:
  using said speaker dependent component to perform speaker verification.

15. The method of claim 11 further comprising:
  using said speaker dependent component to perform speaker identification.

16. The method of claim 11 wherein said training speech data is separated by identifying context dependent data and using said context dependent data to identify said speaker independent data.

17. The method of claim 11 wherein said training speech data is separated by identifying context independent data and using said context independent data to identify said speaker dependent data.

18. The method of claim 11 wherein said maximum likelihood re-estimation step is performed iteratively.

* * * * *

UNITED STATES PATENT AND TRADEMARK OFFICE
CERTIFICATE OF CORRECTION

PATENT NO. : 6,895,376 B2
DATED : May 17, 2005
INVENTOR(S) : Perronnin et al.

It is certified that error appears in the above-identified patent and that said Letters Patent is hereby corrected as shown below:

<u>Column 15,</u>
Line 34, delete "an".

<u>Column 16,</u>
Line 31, "mociels" should be -- models --.

Signed and Sealed this

Sixth Day of September, 2005

JON W. DUDAS
*Director of the United States Patent and Trademark Office*